7756X
W. Field,
Olirer
Patented Sept. 14, 1833.
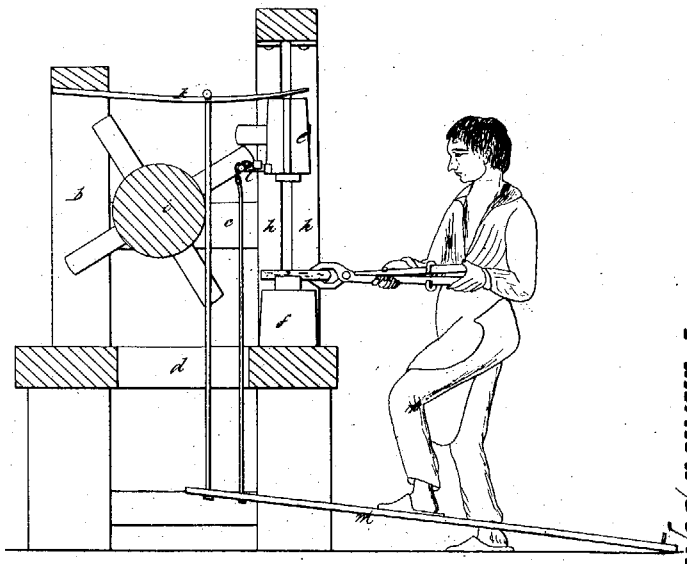
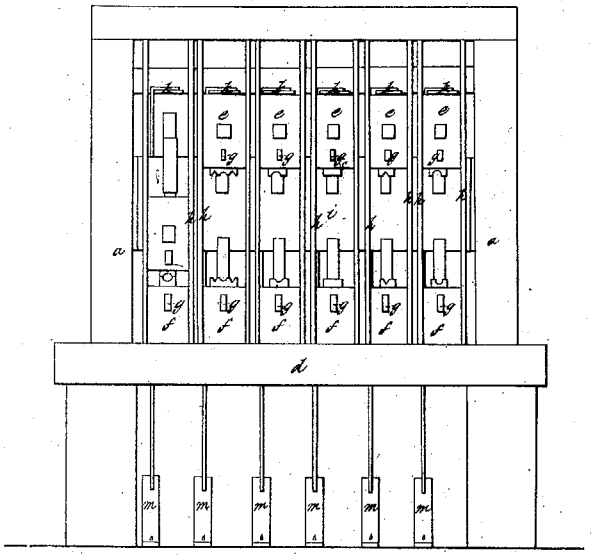
N. PETERS, PHOTO-LITHOGRAPHER, WASHINGTON, D. C.

William Field of North Providence State of Rhode Island

Letters Patent.

The schedule referred to in these Letters Patent and making part of the same containing a description in the words of the said William Field himself of his improvement called the upright Spring sledge hammer.

To all persons to whom these presents shall come,
Be it known that I. William Field of North Providence in the County of Providence, in the State of Rhode Island and Providence Plantations machinist, have invented a new and useful machine called the upright Spring sledge hammer, and that the following is a full and exact description of the construction and operation of the said machine as invented by me, it consists of a platform of sufficient weight and size for the required number of hammers. The frame is composed of two posts, framed into the platform, standing upright, the distance from each other to depend on the number of hammers required, each hammer requiring about thirteen inches in length, also two back posts standing so far in the rear of the first named as to admit the machinery hereafter in this specification described. Said front and rear posts are connected together each by a cap, and between the front and rear posts is framed in at each end a girt.

The hammers are made of cast or wrought iron, in the lower end of each is a square, or round hole to receive the necessary faces and dies for drawing and swedging iron or steel, in its various shapes, and sizes, directly under each hammer is placed an anvil block and anvil having on the top a hole matching with the one in the hammers above to receive a corresponding face or die, through the hammers and anvils are holes for the purpose of driving out the faces, or dies at pleasure. the hammers in operation move up and down on an iron plate [illegible] bar running from one front post to the other, to which the plates or bars are made fast, by bolts. The hammers slide on the plates or bars, and are confined thereto by iron stamps, friction rolls & bolts.

1756X

The hammer in motion is raised by a shaft or cylinder running horizon-
-tally from one end of the frame to the other or [illegible] or [illegible], in the [illegible]
in the rear of the hammers having on its surface cogs which striking similar
projections on the hammers raise them the required height. The blow or
stroke is given by the hammer after the cog leaves it by its own weight
and a stiff spring of wood iron or steel placed on the upper end of
the hammer, and is forced down upon the hammer by a lever, which
is operated by the foot of the workman standing in front of the machine
The aforesaid lever is connected with the spring by an iron rod, and the
workman is able to give the hammer any force he chooses, by pressing
down the lever. The hammers are stopped when the shaft or cylinder is
in full motion, at the pleasure of the workman, by a spring & catch
placed on the main plate by the side of the hammer, which catch is forced
into a notch on the hammer by said spring, and holds the hammer up while
stopped. To put the hammer in motion the spring and catch are drawn
back by an iron rod running from the catch to the lever, by means of which
the hammer may be stopped or put in motion by the foot of the workman
upon the lever at any time.

The above described machine may be operated by water, steam or horse
power, and may be used for all the purposes of the trip hammer over
which it possesses many important advantages.

I claim a Patent as the inventor of said Machine, and for
applying it to the purposes of blacksmithing, for the construction and
form of the hammers, for the plan of putting in the faces and dies, for
the plan of holding the hammer up when stopped by spring and catch,
for the manner of connecting the hammers to the main iron plate or bars by
straps, friction rolls and bolts, for the manner of giving the blow by the spring
and lever, connected by an iron rod at the pleasure of the workman, for the
plan of drawing back the catch and letting the hammer in motion, for the
manner of wedging out the faces and dies and for being able to put from four
[illegible] to six hammers into the space generally occupied by one trip hammer.

[illegible] Witnesses { Joseph Arnold
Thomas [illegible] }

William [illegible].

[illegible]